United States Patent
Gay et al.

[19]

[11] Patent Number: 6,050,767
[45] Date of Patent: Apr. 18, 2000

[54] BULK MATERIAL TRANSPORT APPARATUS AND METHOD

[75] Inventors: William Gay, Bronxville, N.Y.; Chuck Travis, Salt Lake City, Utah

[73] Assignee: ECDC Environmental, L.C., Salt Lake City, Utah

[21] Appl. No.: 09/201,307

[22] Filed: Nov. 30, 1998

[51] Int. Cl.[7] .................................................. B60P 1/64
[52] U.S. Cl. ................................... 414/139.9; 414/139.8; 414/143.2; 414/803
[58] Field of Search ...................... 144/201 R; 414/137.4, 414/139.4, 139.8, 139.9, 140.3, 141.8, 143.1, 143.2, 803

[56] References Cited

U.S. PATENT DOCUMENTS

| | | | |
|---|---|---|---|
| 2,682,751 | 7/1954 | Bock | 414/139.9 X |
| 3,498,477 | 3/1970 | Sommer | 114/201 R X |
| 3,595,405 | 7/1971 | Van Kleunen | 414/139.8 |
| 3,727,776 | 4/1973 | Meeusen . | |
| 3,861,539 | 1/1975 | Becker, Jr. | 414/139.8 |
| 3,962,965 | 6/1976 | Corompt . | |
| 4,309,953 | 1/1982 | Van Plantinga | 414/139.8 X |
| 5,154,561 | 10/1992 | Lee | 414/138.3 |
| 5,544,686 | 8/1996 | Kearney | 141/192 |

FOREIGN PATENT DOCUMENTS

| | | | |
|---|---|---|---|
| 54-104190 | 8/1979 | Japan | 414/143.1 |
| 4-153102 | 5/1992 | Japan | 414/137.4 |
| 1169827 | 11/1969 | United Kingdom | 414/137.4 |

*Primary Examiner*—Janice L. Krizek
*Attorney, Agent, or Firm*—Baker Botts L.L.P.

[57] ABSTRACT

Bulk material is loaded at a marine transfer station into a plurality of inter-modal containers that have removable top lids and are received side by side in the hopper of a barge. A gantry carried by the barge removes the lids from the containers and moves them to a storage rack on the barge, where they reside while the containers are loaded with material trucked to the facility and dumped into the open containers from a tipping floor. After the containers are loaded and, if desirable or necessary, the material in them leveled and compacted, the gantry replaces the lids on the containers. The barge is then moved over a waterway to a container handling facility, where the containers are transferred to rail cars or roadway tractor trailers for transport overland.

19 Claims, 7 Drawing Sheets

BULK MATERIAL TRANSPORT APPARATUS AND METHOD

BACKGROUND OF THE INVENTION

Bulk materials, such as coal, ores, grains, contaminated earth, and refuse, are frequently delivered by trucks to a marine transfer station where they are loaded onto barges and transported over a waterway to a destination and unloaded. Commonly, the materials are unloaded from the barges at the destination and processed, used, disposed of, or transferred to ships or rail cars at the waterside destination. Historically, it has been common practice, whenever possible, to locate ore-processing plants and mills, power generating stations, large bulk material handling facilities, waste disposal plants, and landfill areas on waterways so that bulk materials used, processed or transferred can be brought in by barges. Transport of bulk materials by barge is economical, free from wear and tear of the way over which the transport vehicles travel—unlike roads and rails, which require frequent maintenance and repair—and can use waterways that are not navigable by large ships.

A specific example of the effective use of barges is found in the handling of garbage in large areas of New York City. Trucks pick up garbage from residences and commercial establishments, deliver it to marine transfer terminals, and dump it through tipping holes in an elevated tipping floor into the hoppers of barges that are tied up in slips below the tipping holes. The loaded barges are towed to waterside landfill areas, where the garbage is unloaded and disposed of as landfill. Landfill areas that are reasonably accessible to the marine transfer terminals by barge are reaching capacity and are soon going to have to be closed. Suitably located new landfill areas are not likely to be available. There is, accordingly, an urgent need for a new way to transport garbage to distant landfill areas.

SUMMARY OF THE INVENTION

An object of the present invention is to provide a bulk material transfer apparatus and method that facilitates transport of bulk materials to locations remote from waterways but uses presently existing trucks, marine transfer stations, and barges, as well as other presently existing equipment and installations for materials handling and transport. It is also an object of the present invention to minimize the need for new equipment and facilities for transporting bulk materials. Yet another object is to avoid adding to the traffic burden of roadways to meet the need for transporting bulk materials by truck over longer distances than have previously been necessary.

The foregoing objects are attained, in accordance with the present invention, by a bulk material transport apparatus that includes a barge having a hopper and a plurality of containers received side-by side in closely spaced-apart relation in the hopper, each container having a top opening for reception of bulk material into the container and a removable lid for closing the top opening of each container. The barge is fitted with one or more storage racks for storing the lids while the containers are being loaded with bulk material and with apparatus, such as a gantry, for removing the lids from the containers, moving them to the storage rack and placing them on the storage rack to enable the containers to be loaded with bulk material and for removing the lids from the storage rack, moving them to the containers and placing them over the openings of the containers after the containers have been loaded with bulk material.

In its broadest aspects, as described above, the present invention makes use of presently available, simple hopper barges. The barges are retrofitted—or may, of course, be newly built and fitted out—to include racks for temporary storage of the container lids and a gantry for handling the lids. The provision for handling and storage of the container lids on the barge rather than on a pier permits the barge to be loaded at existing marine transfer stations without having to add equipment to the transfer stations, which might not have available space on the piers or superstructure and which might interfere with the transfer of material from trucks to the barge. A barge-mounted gantry can also be relatively small and economical, as compared to a gantry installed on the superstructure of the marine transfer station.

In preferred embodiments of the invention, the containers are inter-modal transport containers that are adapted to be transported on rail cars and roadway tractor trailers. Inter-modal containers are widely available at relatively low cost and are readily handled at existing container handling facilities at many water side locations that are also rail and/or truck terminals. As described below, the present invention includes the transfer of loaded containers from the barges to other transport modes, particularly railways. It is preferred that the top openings of the containers be substantially coextensive with the upper ends of side walls and end walls of the containers, which facilitates emptying loads from tipping trucks and eliminates the need for conveyors or other special bulk material transfer apparatus.

According to another aspect of the present invention, removable covers are installed over spaces between the side walls of each adjacent pair of containers when the containers are being loaded with bulk material. The covers prevent the bulk material from falling into the spaces between the containers. The covers may have sloping walls adapted to direct bulk material into the containers.

As alluded to above, the barge may be loaded at a marine transfer station that has a slip for the barge and a tipping floor above the slip onto which trucks carrying bulk material can be driven. The trucks dump the materials into the containers through an opening in the tipping floor.

The apparatus of the present invention may include equipment, such as a mobile vehicle equipped with a controllable moveable arm that carries a leveling and compacting tool, for leveling and compacting the bulk material in the containers after the containers have been loaded. A mobile vehicle has the advantage of being able to operate at multiple slips and of moving along either the pier floor or the tipping floor of a marine transfer station.

The method of the present invention includes the loading of the bulk material into the containers in the barge hopper while the container lids are stored on the barge, replacing the lids on the loaded containers, and moving the barge over a waterway to a container handling facility remote from the marine transfer terminal, where the containers are unloaded from the barge and placed on rail cars or roadway tractor trailers for transport overland to a location remote from the container handling facility. The method may use existing container handling facilities, many of which are located at waterside ports that are also served by rail and truck terminals. The destination container handling facility will have cranes or gantries for picking up containers from the barges and transferring them to rail cars or truck trailers and for placing empty containers in the barges.

DESCRIPTION OF THE DRAWINGS

For a more complete understanding of the present invention, and the advantages thereof, reference may be made to the following written description of exemplary embodiments, taken in conjunction with the accompanying drawings.

DESCRIPTION OF THE EMBODIMENT

Figure 1A:
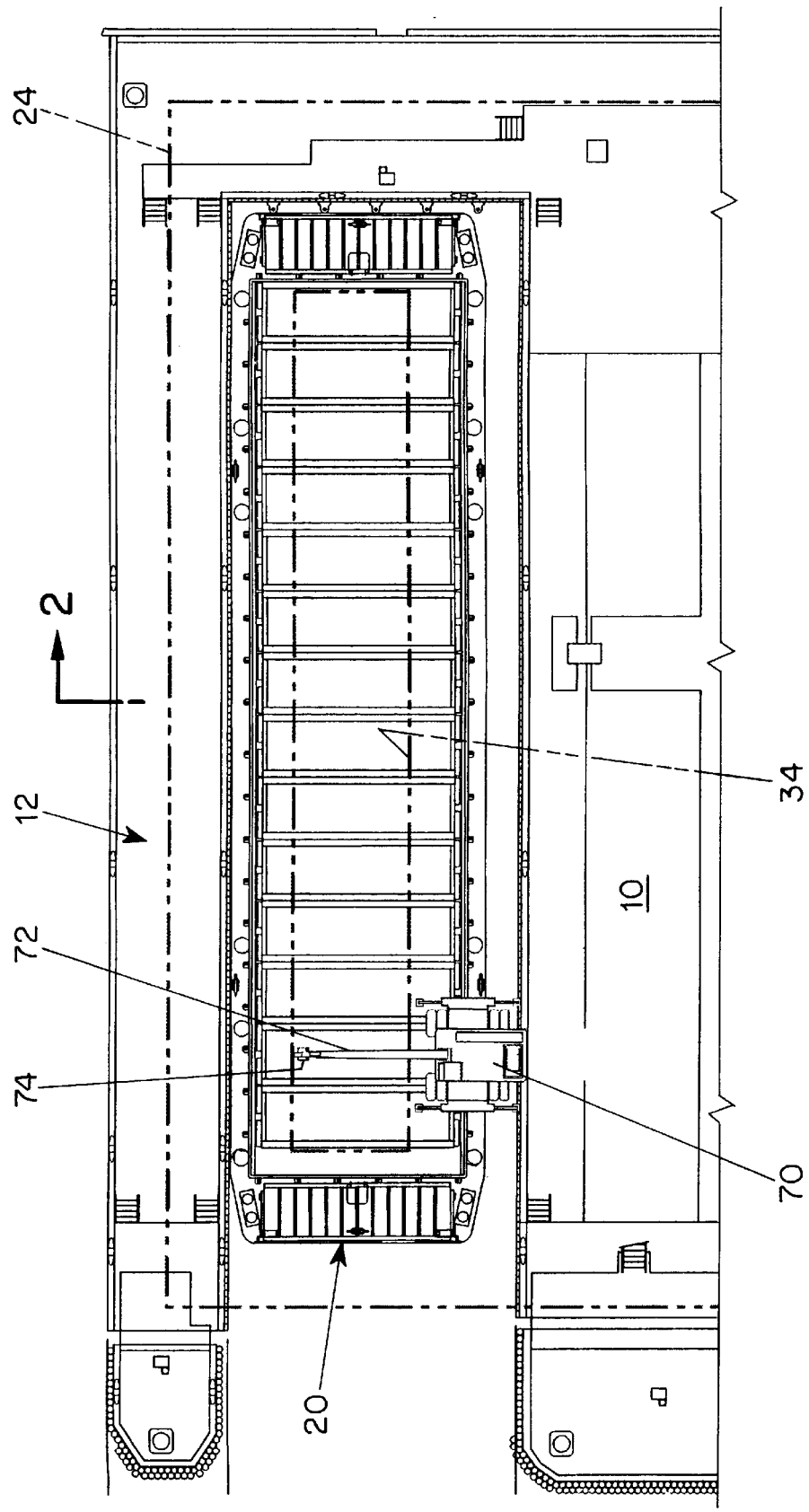
FIGS. 1A and 1B together constitute a top plan view of a marine transfer terminal and show in FIG. 1A one barge that has been loaded being leveled and compacted in one slip and in FIG. 1B another barge in the other slip that is being loaded.
Figure 1B:
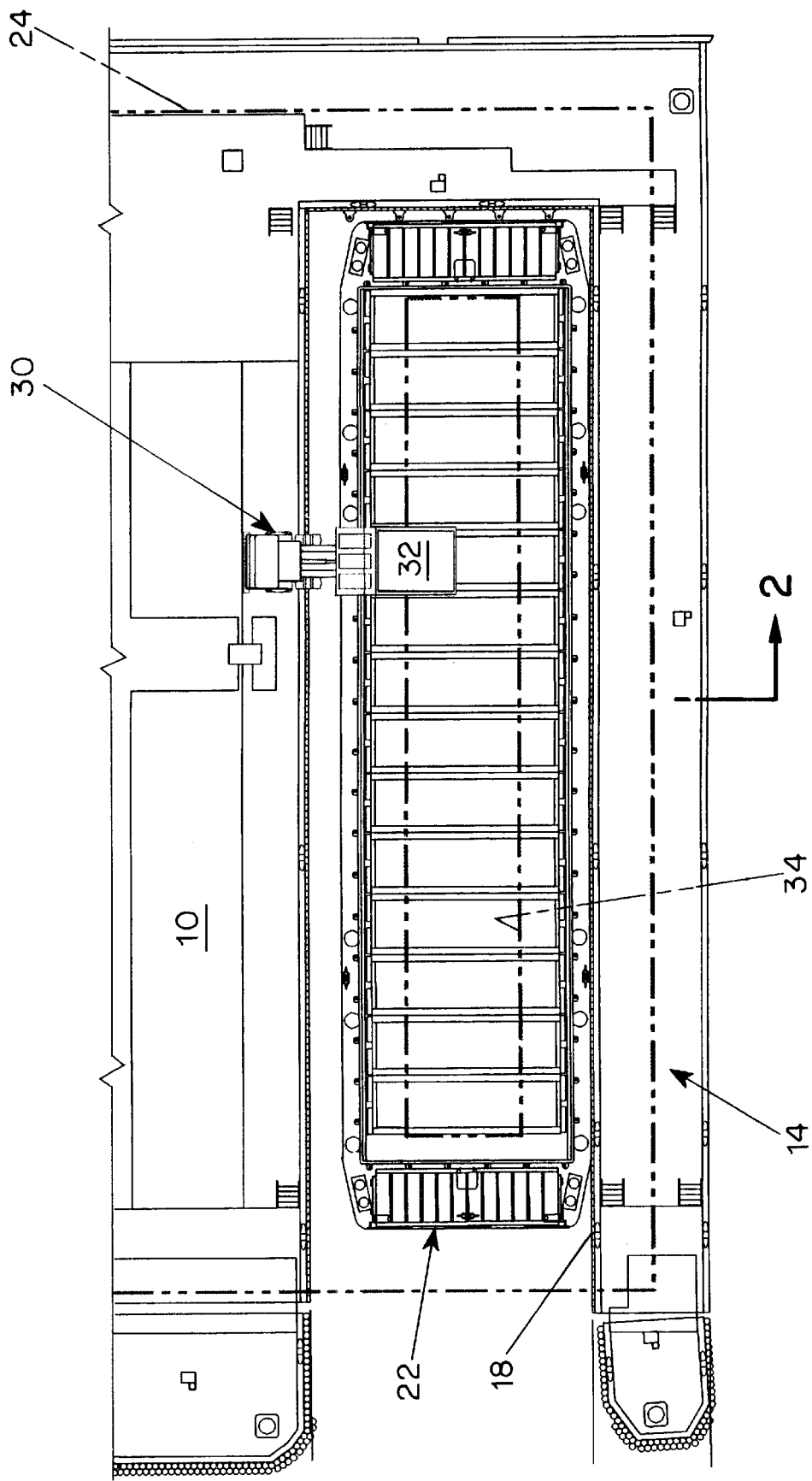
Figure 2:
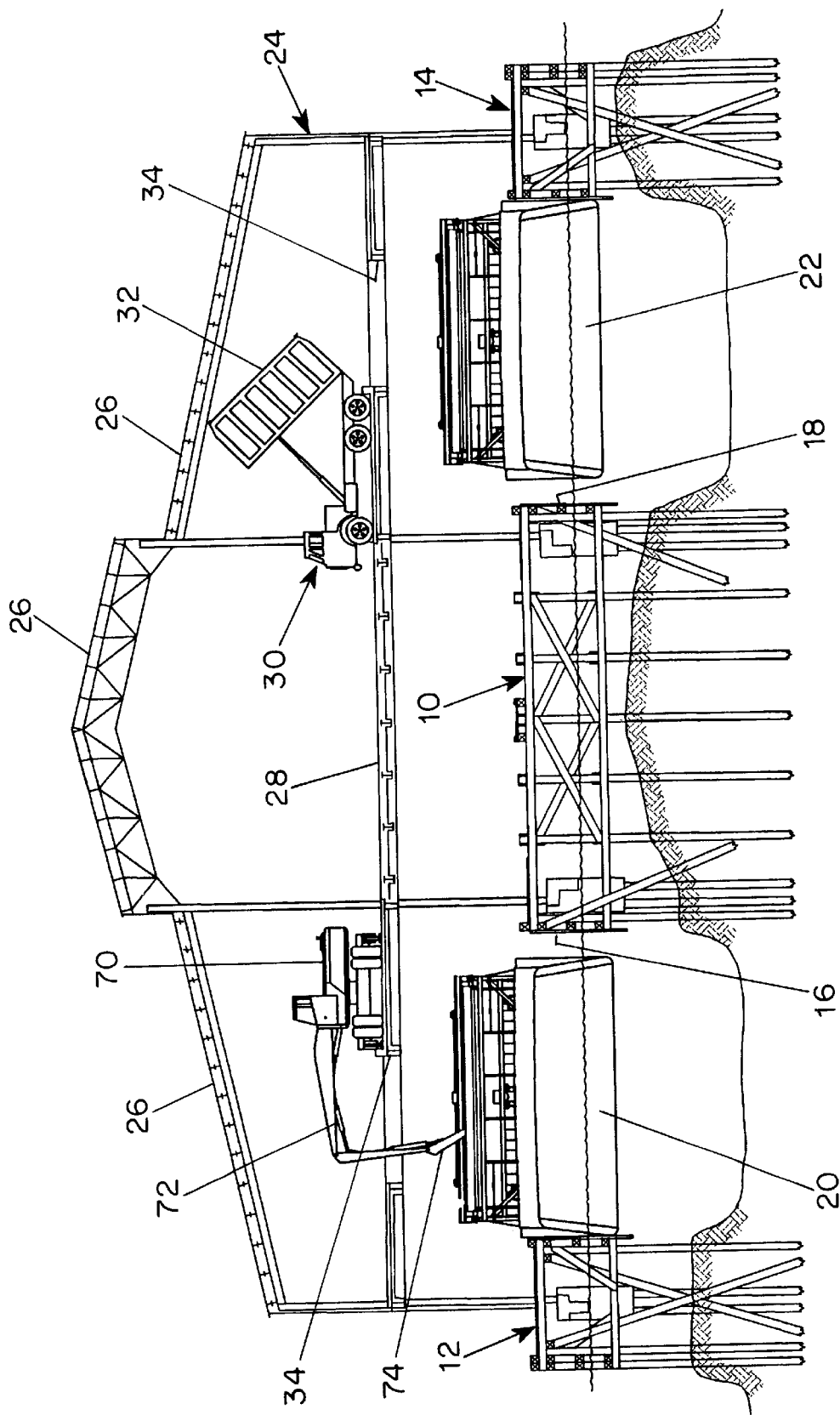
FIG. 2 is an end cross-sectional view of the marine transfer terminal shown in FIGS. 1A and 1B, the view being taken along the line A—A of FIGS. 1A and 1B.
Figure 3:
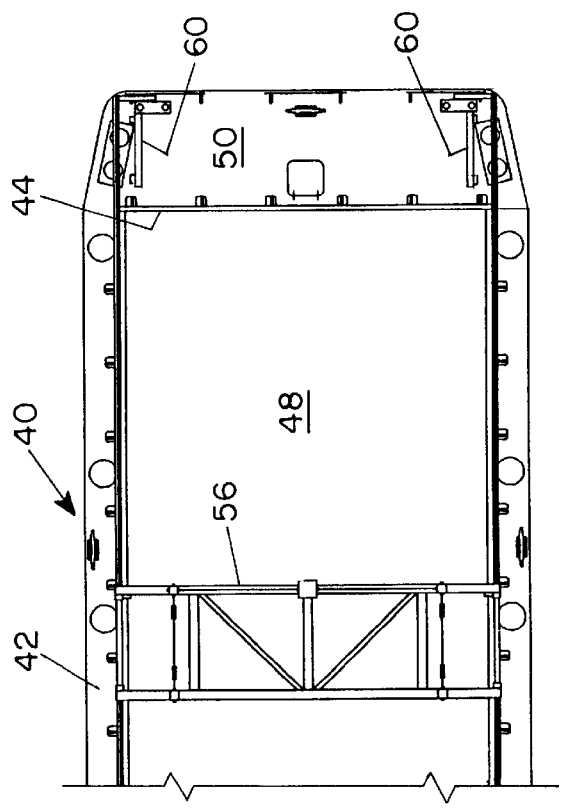
FIG. 3 is a top plan view of a barge that is equipped with a gantry for handling container lids, a portion of the barge being cut away.
Figure 3:
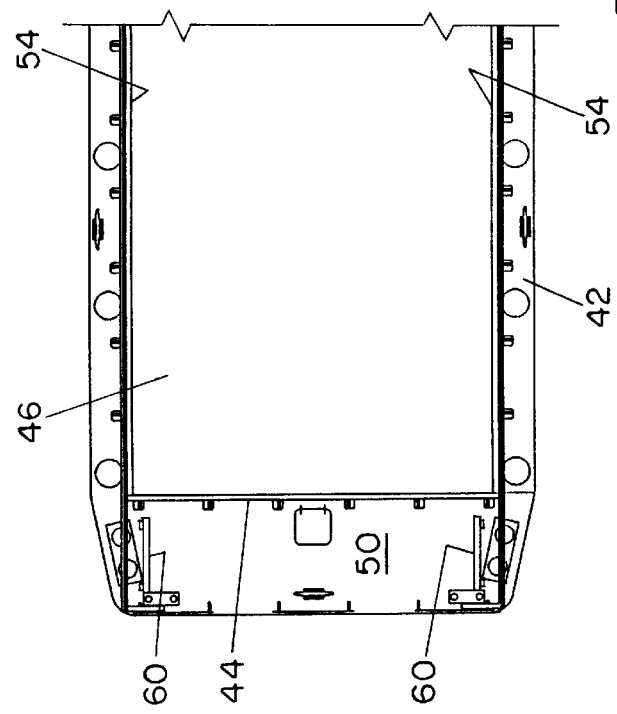

FIGS. 1A, 1B and 2 reasonably accurately show an existing marine transfer station, the Greenpoint Marine to Transfer Station, which is located in Brooklyn, N.Y., and is operated by the City of New York. The City of New York operates several marine transfer stations that are essentially the same as the one shown in FIGS. 1A, 1B and 2. The station has a center pier 10 and side piers 12 and 14 that provide two slips 16 and 18 for barges 20 and 22. Barges 20 and 22, which incorporate the present invention, are shown in FIGS. 1A, 1B and 2, but the Marine Transfer Station, as shown, is currently used with conventional barges. A structure 24 above the piers supports a roof 26 and a tipping floor 28. Garbage collection trucks 30 with tipping bodies 32 are driven onto the tipping floor 28 and backed up to openings 34 in the tipping floor. The bodies are tipped up to discharge the contents through the openings 34 into the barge hoppers. When the barges are full, they are towed across New York harbor to a waterside landfill area (e.g., the Fresh Kills Landfill) on Staten Island, where they are emptied and the contents transferred to the landfill. The Fresh Kills Landfill is soon to be closed, and other landfills suitable for transferring garbage by barge from the Greenpoint Marine Transfer Station are not available. Indeed, landfills for garbage disposal nearby many large metropolitan areas in the United States and other countries are becoming increasingly scarce. It is also undesirable for environmental reasons to continue to use available landfill areas proximate to highly populated regions for disposal of garbage and other refuse, such as contaminated earth. The present invention provides an economical way for transporting garbage from a marine transfer station to a landfill remote from any navigable waterway. The present invention is not, however, limited to transport of garbage and may be used for other bulk materials.

Figure 4:
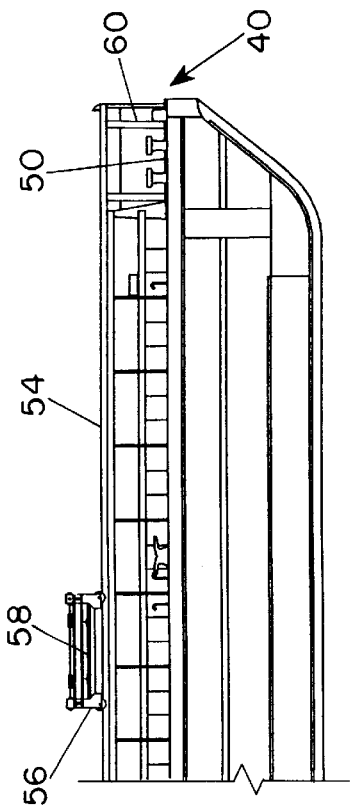
FIG. 4 is a side a elevational view of the barge, again with a portion cut away.
Figure 4:
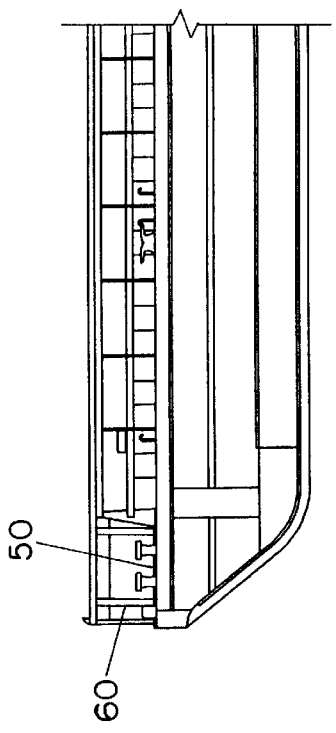
Figure 6:
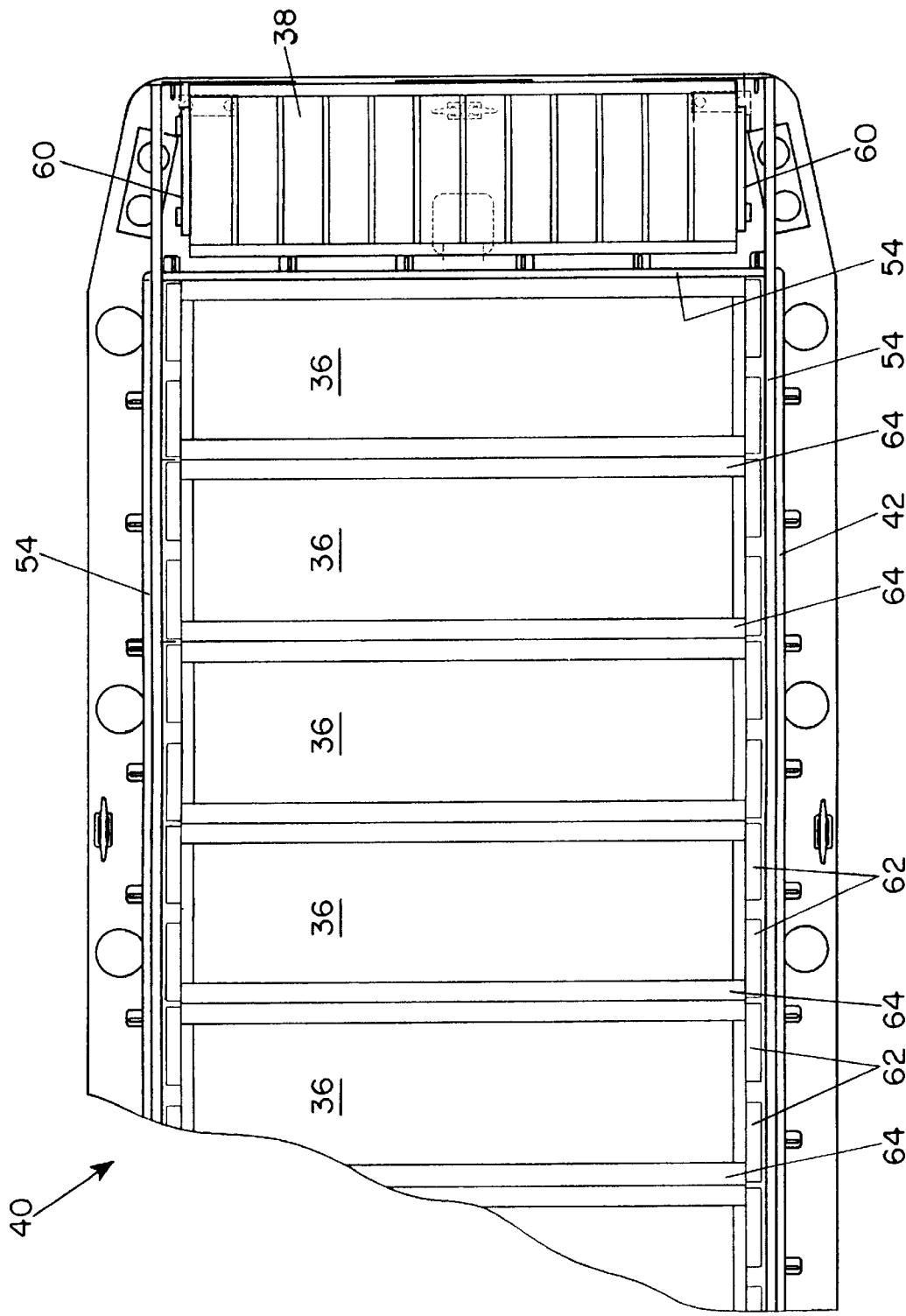
FIG. 6 is a partial top plan view of the barge, showing the containers in place for loading and the container lids stored on racks.
Figure 7:
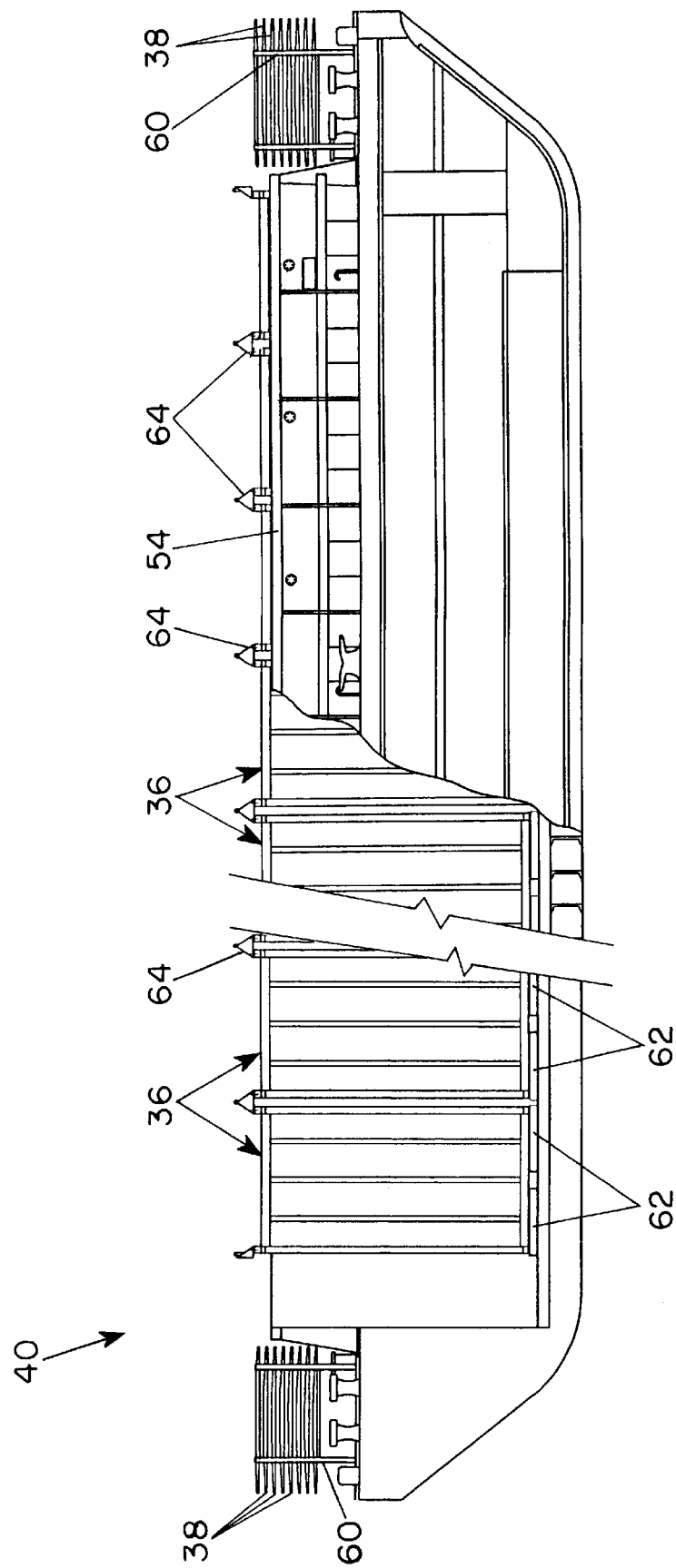
FIG. 7 is a side elevational view of the barge, again showing the containers in place for loading and a portion being cut away.
Figure 5:
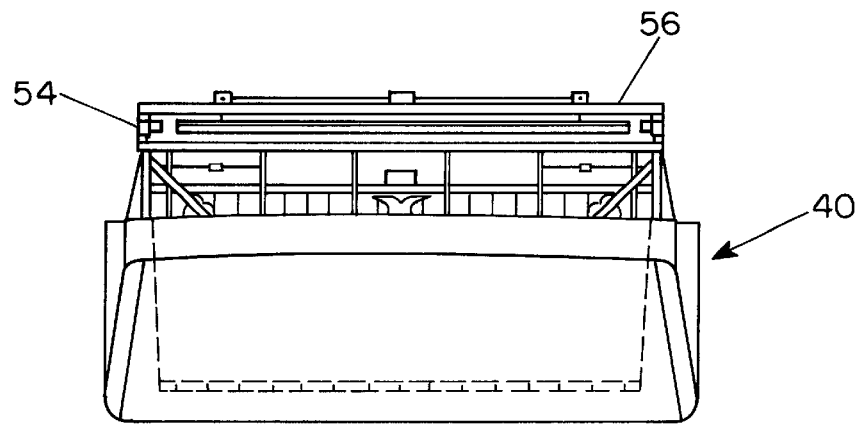
FIG. 5 is an end elevational view of the barge.

One aspect of the present invention involves fitting out new or used conventional hopper barges to receive open-topped inter-modal containers 36 that have removable lids 38 over the top openings through which bulk material is loaded into the containers and to handle and store the container lids 38. As shown in FIGS. 4 to 6, a conventional hopper barge 40 has side walls 42 and end walls 44 that define a rectangular hopper 46 that is open at the top and has a flat floor 48. There is a deck 50 at each end of the barge. The conventional barge is modified to handle and store the removable lids 38 of the containers 36 by installing a gantry, which consists of a rail 54 mounted on the top of each side wall 42, a carriage 56 supported to roll along the rails 42, a lifting frame 58 carried by the carriage 56, a drive (not shown) for moving the carriage along the rails 42, and a hoist (not shown) for raising and lowering the lifting frame. The lifting frame of the gantry has suitable fittings for attaching the lids 38 to the frame so that the lids can be lifted from the containers 36 and moved by the gantry to either of two lid storage racks 60 (see FIGS. 6 and 7), each of which is mounted on one of the decks 50, and lowered onto the storage rack.

Figure 8:
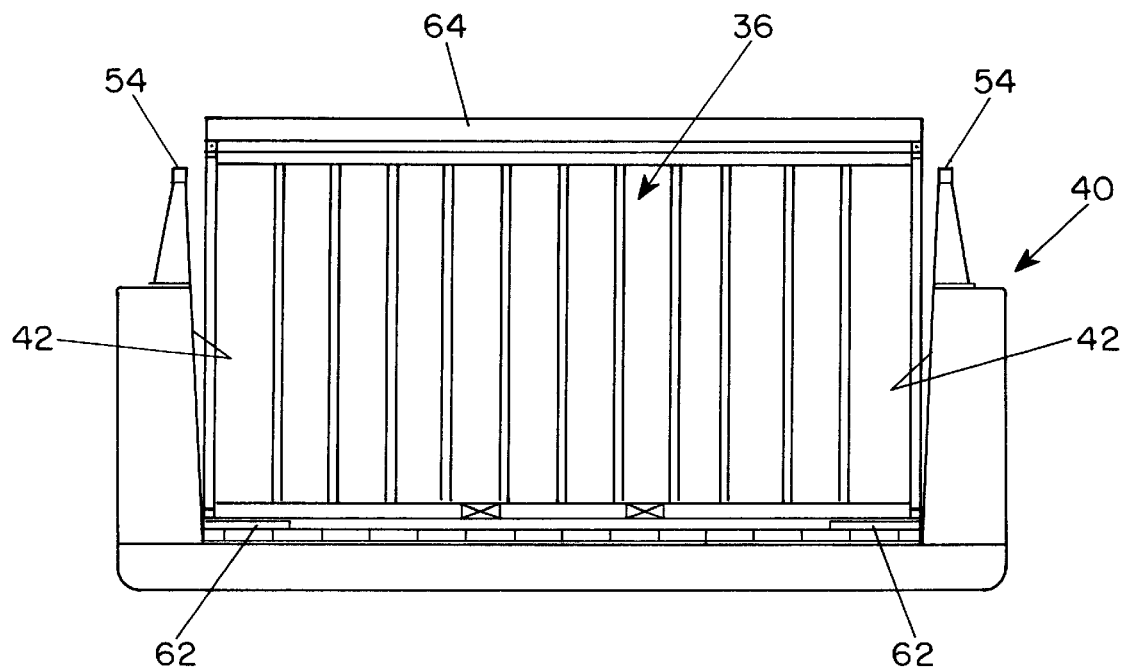
FIG. 8 is an end cross-sectional view of the barge, showing the containers in place for loading.

The containers 36 are removably received in the barge hopper 46 in closely spaced-apart, side-by-side relation. Suitable guide and positioning brackets (not shown) are installed on the floor 48 of the hopper to guide each container 36 into the desired position as it is lowered into place. A low profile weight scale 62 (see FIGS. 6 to 8) is installed on the floor of the barge hopper at each corner of each container so that each filled container can be weighed.

Each barge arrives at the marine transfer station upon return from the container handling facility with the containers 36 empty and covered by the lids 38. The containers 36 are readied to receive garbage by removing the lids 38 from the containers and storing the lids on the racks 60, using the gantry. To prevent garbage from falling into the spaces between the side walls of the adjacent pairs of containers, elongated inverted V-shaped covers 64 are installed over the spaces. The covers 64 can be stored on the center pier 10 of the transfer facility and handled in any suitable way, such as a fork lift truck with a suitable lifting rig (not shown). The covers 64 deflect material dropping onto them from the trucks into the containers. Instead of having separate covers 64, the containers 36 may have deflector flanges at the upper edges of the side walls.

Just as open hoppers are currently loaded by dumping garbage from the trucks 30 through the tipping floor openings 34, so also are the containers 36 loaded. The two slips of the transfer station permit two barges to be loaded, either sequentially or in tandem. A mobile vehicle 70 equipped with a controllable moveable arm 72 that carries a leveling and compacting tool 74 levels and compacts the garbage in each container 36 so that it lies below the top of each container and allows the lid to be replaced on the container. After the containers on each barge are loaded and the contents leveled and compacted, the covers 64 are removed by the forklift truck and the lids 38 are picked up from the racks 60 and moved back to and replaced on the containers 36 by the gantry 56.

The loaded barges are towed from the transfer station over a waterway to a container handling facility, where they are removed from the barge and placed on railcars (preferred) or roadway truck trailers for transport to a remote landfill, which may be at a considerable distance from the container handling facility. As is well known per se, inter-modal containers have fittings that enable them to be positioned on and latched to other vehicles, which have mating fittings for accepting the containers. It is becoming increasingly common for landfills to be located along a railway line and to be equipped to pick up, move and empty inter-modal containers and replace the empty containers on the rail cars. The empty containers, lids in place, are transported by rail back to the container handling facility, loaded onto empty barges, and towed back to the marine transfer station.

Generally, the container handling facility provides a staging area for retaining full containers until a train can be made up with an economically large enough load to be moved to the remote landfill. The container handling facility also provides a staging area for empty containers that are returned by rail from the landfill. As barges with filled containers arrive, the full containers are unloaded and staged for outbound transport, and staged empty containers are placed on the empty barges, which are towed back to the marine transfer station.

The above-described embodiment solves a specific transport problem and does so in a way that makes use of existing equipment and facilities with minimum investment required, mainly the costs of retrofitting existing hopper barges for receiving containers and handling and storing the container lids on the barges. The present invention is believed to have applications in the transport of other bulk materials, sometimes using new equipment and facilities. For example, various crops may be grown nearby a waterway but remote from a railway. Rather than trucking the crops from the fields to the distant railway, the crops can be trucked to the nearby waterway and loaded on containers that are transported by barge over the waterway to the railway. The use of covered inter-modal containers protects the bulk materials from the environment and often, as in the case of garbage and other waste materials, the environment from the materials.

What is claimed is:

1. Bulk material transport apparatus comprising a barge having a hopper;

a plurality of containers received side-by side in closely spaced-apart relation in the hopper, each container having an open top, a closed bottom, end walls and side walls for reception of bulk material into the container while the container is in the hopper, said containers being removable from said hopper;

a removable lid for separately closing the open top of each container;

a storage rack on the barge for storing the lids while the containers are being loaded with bulk material; and means for removing the lids from the containers, moving them to the storage rack and placing them on the storage rack to enable the containers to be loaded with bulk material through said open tops and for removing the lids from the storage rack, moving them to the containers and placing them over the open tops of each of said containers to close said open tops after the containers have been loaded with bulk material.

2. The bulk material transport apparatus according to claim 1 wherein the means for removing, moving and placing the lids is carried on the barge.

3. The bulk material transport apparatus according to claim 1 wherein the means for removing, moving and placing the lids is a gantry.

4. The bulk material transport apparatus according to claim 2 wherein the means for removing, moving and placing the lids is a gantry.

5. A bulk material transport method comprising the steps of providing a barge having a hopper and a lid storage rack at a slip in a material transfer terminal;

providing a plurality of containers, each container having a top opening for reception of bulk material into the container and a removable lid for covering the top opening of the container;

positioning the containers in the barge hopper in closely spaced-apart adjacent relation;

removing the lids from the containers, moving the lids to the storage rack, and placing the lids on the storage rack;

loading bulk material into the containers;

removing the lids from the storage rack, moving the lids to the containers, and placing the lids over the openings of the containers after the containers have been loaded with bulk material; and moving the barge from the slip over a waterway to a container handling facility remote from the marine transfer terminal, unloading the containers from the barge, loading the containers onto rail cars or roadway tractor trailers at the container handling facility, and transporting the containers from the container handling facility on the rail cars or roadway tractor trailers overland to a location remote from the container handling facility.

6. The bulk material transport method according to claim 5 wherein the lids are removed, moved and placed by a gantry.

7. The bulk material transport method according to claim 5 wherein the containers are inter-modal transport containers.

8. The bulk material transport method according to claim 7 wherein the top openings of the containers are substantially coextensive with upper ends of side walls and end walls of the containers.

9. The bulk material transport method according to claim 5 and further comprising the step of placing removable covers over the spaces between the side walls of each adjacent pair of containers when the containers are being loaded with bulk material, the covers being configured to prevent the bulk material from falling into the spaces and to direct bulk material into the containers.

10. The bulk material transport method according to claim 5 wherein the containers are loaded with bulk material at a marine transfer station having a slip for the barge and a tipping floor above the slip onto which trucks carrying bulk material can be driven, the tipping floor having an opening above the slip through which the contents of the trucks are discharged into the containers.

11. The bulk material transport method according to claim 5 and further comprising the step of leveling and compacting the bulk material in each container after the container has been loaded and before the lid is replaced on the container.

12. The bulk material transport method according to claim 11 wherein the bulk material is leveled and compacted by a mobile vehicle equipped with a controllable moveable arm that carries a leveling and compacting tool.

13. Bulk material transport apparatus comprising a barge having a hopper;

a plurality of inter-modal transport containers adapted to be transported on rail cars and roadway tractor trailers received side-by-side in closely spaced-apart relation in the hopper, each container having an open top for reception of bulk material into the container;

a removable lid for separately closing the open top of each container;

a storage rack on the barge for storing the lids while the containers are being loaded with bulk material; and means for removing the lids from the containers, moving them to the storage rack and placing them on the storage rack to enable the containers to be loaded with bulk material through said open top and for removing the lids from the storage rack moving them to the containers and placing them over the open top of each of said containers to close said open tops after the containers have been loaded with bulk material.

14. Bulk material transport apparatus comprising:

a barge having a hopper;

a plurality of containers received side-by-side in closely spaced-apart relation in the hopper, each container having a top opening substantially co-extensive with the upper ends of side walls and end walls of the containers for reception of bulk material into the container;

a removable lid for the top opening of each container;

a storage rack on the barge for storing the lids while the containers are being loaded with bulk material;

means for removing the lids from the containers, moving them to the storage rack and placing them on the storage rack to enable the containers to be loaded with bulk material and for removing the lids from the storage rack, moving them to the containers and placing them over the openings of the containers after the containers have been loaded with bulk material; and removable covers received over spaces between the side walls of each adjacent pair of containers when the containers are being loaded with bulk material, the covers being adapted to prevent the bulk material from falling into the spaces.

15. The bulk material transport apparatus according to claim 14 wherein the covers have sloping walls adapted to direct bulk material into the containers.

16. The bulk material transport apparatus according to claim 15 and further comprising a marine transfer station having a slip for the barge and a tipping floor above the slip onto which trucks carrying bulk material can be driven, the tipping floor having an opening above the slip through which the contents of the trucks can be discharged into the containers.

17. The bulk material transport apparatus according to claim 16 and further comprising means for leveling and compacting the bulk material in the containers after the containers have been loaded.

18. The bulk material transport apparatus according to claim 17 wherein the means for leveling and compacting the bulk material is carried by the tipping floor.

19. The bulk material transport apparatus according to claim 18 wherein the means for leveling and compacting the bulk material is a mobile vehicle equipped with a controllable moveable arm that carries a leveling and compacting tool.

* * * * *